US010616916B2

(12) United States Patent
Kim et al.

(10) Patent No.: US 10,616,916 B2
(45) Date of Patent: Apr. 7, 2020

(54) METHODS FOR MULTIPLEXING SCHEDULING REQUEST INFORMATION AND HARQ ACK/NACK INFORMATION WHILE TRANSMITTING AND RECEIVING PUCCH AND APPARATUSES THEREOF

(71) Applicant: KT CORPORATION, Gyeonggi-do (KR)

(72) Inventors: Ki-tae Kim, Seoul (KR); Woo-jin Choi, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 15/990,917

(22) Filed: May 29, 2018

(65) Prior Publication Data
US 2018/0352568 A1    Dec. 6, 2018

(30) Foreign Application Priority Data

May 31, 2017   (KR) .......................... 10-2017-0068023
Oct. 18, 2017   (KR) .......................... 10-2017-0135330

(51) Int. Cl.
*H04W 72/12*        (2009.01)
*H04L 1/18*         (2006.01)
(Continued)

(52) U.S. Cl.
CPC ....... *H04W 72/1294* (2013.01); *H04L 1/1671* (2013.01); *H04L 1/1812* (2013.01);
(Continued)

(58) Field of Classification Search
CPC ......... H04W 72/1294; H04W 72/1284; H04W 72/0406; H04W 76/27; H04W 72/1242;
(Continued)

(56) References Cited

U.S. PATENT DOCUMENTS

2015/0289259 A1*  10/2015  Yang ..................... H04L 1/0027
                                                              370/329
2016/0050632 A1*  2/2016  Falahati ................ H04L 5/0055
                                                              370/329

(Continued)

OTHER PUBLICATIONS

NTT Docomo, Inc., "sPUCCH for shortened TTI", R1-1610047, 3GPP TSG RAN WG1 Meeting #86bis, Lisbon, Portugal Oct. 10-14, 2016, pp. 1-8.

*Primary Examiner* — Dady Chery
(74) *Attorney, Agent, or Firm* — IP Legal Services, LLC

(57) ABSTRACT

Disclosed is a method of multiplexing and transmitting/receiving scheduling request (SR) information and HARQ ACK/NACK information through short PUCCH (sPUCCH) consisting two or three symbols when an uplink control channel is transmitted. A method of a terminal transmitting the uplink control channel includes configuring i) first uplink control channel resources for indicating only the HARQ ACK/NACK information and ii) second uplink control channel resources for indicating both of SR information and the HARQ ACK/NACK information, setting the uplink control channel to include the SR information and the HARQ ACK/NACK information, and transmitting the uplink control channel, which consists of two or three symbols in one short transmission time interval (sTTI), to a base station.

12 Claims, 11 Drawing Sheets

(51) Int. Cl.
*H04W 76/27* (2018.01)
*H04W 72/04* (2009.01)
*H04L 5/00* (2006.01)
*H04L 1/16* (2006.01)

(52) U.S. Cl.
CPC .......... *H04L 1/1861* (2013.01); *H04L 5/0053* (2013.01); *H04L 5/0055* (2013.01); *H04W 72/0406* (2013.01); *H04W 72/1284* (2013.01); *H04W 76/27* (2018.02); *H04W 72/1242* (2013.01)

(58) Field of Classification Search
CPC ... H04L 5/0053; H04L 5/0055; H04L 1/1861; H04L 1/1812
See application file for complete search history.

(56) References Cited

U.S. PATENT DOCUMENTS

| | | | | |
|---|---|---|---|---|
| 2017/0223695 | A1* | 8/2017 | Kwak | ............... H04W 56/0075 |
| 2018/0375619 | A1* | 12/2018 | Hwang | .................... H04B 7/26 |
| 2018/0375649 | A1* | 12/2018 | Goller | ................... H04L 9/0844 |
| 2019/0045527 | A1* | 2/2019 | Shimezawa | ........... H04W 28/04 |

* cited by examiner

Normal CP case

METHODS FOR MULTIPLEXING SCHEDULING REQUEST INFORMATION AND HARQ ACK/NACK INFORMATION WHILE TRANSMITTING AND RECEIVING PUCCH AND APPARATUSES THEREOF

CROSS REFERENCE TO RELATED APPLICATION

This application claims priority from Korean Patent Application Nos. 10-2017-0068023 & 10-2017-0135330, filed on May 31, 2017 & Oct. 18, 2017, which are hereby incorporated by reference for all purposes as if fully set forth herein.

BACKGROUND OF THE INVENTION

1. Field of the Invention

The present disclosure relates to a method and an apparatus for multiplexing scheduling request information and HARQ ACK/NACK information through short PUCCH (sPUCCH) consisting of two or three symbols with a short transmission time interval (sTTI) while transmitting and receiving an uplink control channel.

2. Description of the Related Art

Recently, research and discussion have been conducted on latency reduction in 3GPP LTE/LTE-Advanced systems. The main purpose of latency reduction is to standardize the operation of a short transmission time interval (hereinafter referred to as "short TTI" or "sTTI") in order to improve TCP throughput.

A short TTI frame structure configures frames in a legacy LTE/LTE-Advanced frame structure (i.e., TTI=1 ms=14/12 OFDM symbols) in units of 2, 3, or 7 symbols. By transmitting and receiving data on the basis of the short TTI frame structure, it is possible to reduce latency and improve data throughput.

To this end, discussions are underway on the performance of short TTI, the feasibility and performance of TTI lengths between 0.5 ms and one OFDM symbol, maintenance of backwards compatibility, and the like.

In the study on a physical layer of the above-described short TTI, sequence-based short PUCCH (sPUCCH) transmission was decided. The sequence-based sPUCCH is an uplink control channel (PUCCH) consisting of two or three symbols and does not use DMRS. However, recently, another discussion is underway on a detailed method for transmitting scheduling request (SR) information as well as HARQ ACK/NACK (hereinafter also referred to as "A/N" or "ACK/NACK") information by using the sequence-based sPUCCH.

SUMMARY OF THE INVENTION

Exemplary embodiments provide a detailed operating method between a terminal and a base station to multiplex and transmit/receive scheduling request information and HARQ ACK/NACK information through short PUCCH (sPUCCH) consisting of two or three symbols when an uplink control channel is transmitted or received.

According to an embodiment of the present disclosure, there is provided a method of a terminal transmitting an uplink control channel, the method including configuring i) first uplink control channel resources for indicating only the HARQ ACK/NACK information and ii) second uplink control channel resources for indicating both of the SR information and the HARQ ACK/NACK information; setting the uplink control channel to include the SR information and the HARQ ACK/NACK information; and transmitting the uplink control channel, which consists of two or three symbols in one short transmission time interval (sTTI), to the BS.

According to another embodiment of the present disclosure, there is provided a method of the BS receiving an uplink control channel, the method including transmitting, to a terminal, information for configuring i) first uplink control channel resources for indicating only the HARQ ACK/NACK information and ii) second uplink control channel resources for indicating both of the SR information and the HARQ ACK/NACK information; receiving the uplink control channel, which consists of two or three symbols in one sTTI, from the terminal; and detecting the SR information and the HARQ ACK/NACK information from the uplink control channel.

According to a still another embodiment of the present disclosure, there is provided a terminal for transmitting an uplink control channel, the terminal including a control unit configured to configure i) first uplink control channel resources for indicating only the HARQ ACK/NACK information and ii) second uplink control channel resources for indicating both of the SR information and the HARQ ACK/NACK information and set the uplink control channel to include the SR information and the HARQ ACK/NACK information; and a transmission unit configured to transmit the uplink control channel, which consists of two or three symbols in one sTTI, to the BS.

According to a yet another embodiment of the present disclosure, there is provided the BS for receiving an uplink control channel, the BS including a transmission unit configured to transmit, to a terminal, information for configuring i) first uplink control channel resources for indicating only the HARQ ACK/NACK information and ii) second uplink control channel resources for indicating both of the SR information and the HARQ ACK/NACK information; a reception unit configured to receive the uplink control channel, which consists of two or three symbols in one sTTI, from the terminal; and a control unit configured to detect the SR information and the HARQ ACK/NACK information from the uplink control channel.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Figure 1:
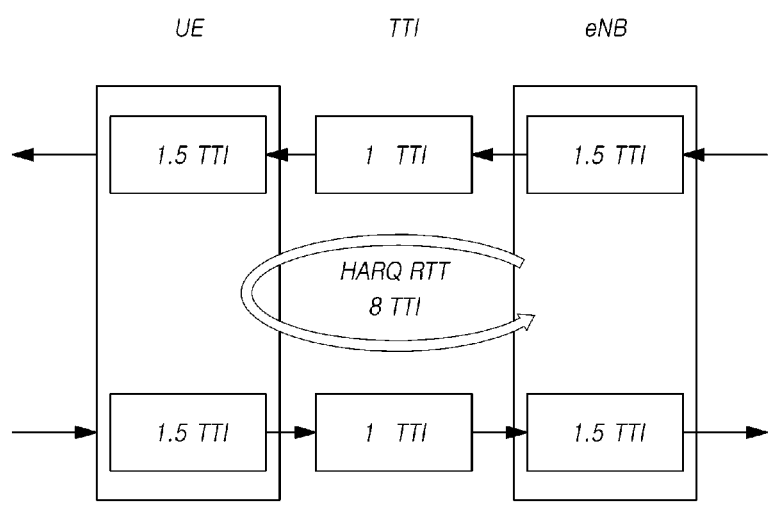
FIG. 1 is a diagram showing processing delays and a HARQ round trip time (RTT) in a base station (BS) and a terminal.

Hereinafter, embodiments of the present disclosure will be described in detail with reference to the accompanying drawings. In adding reference numerals to elements in each drawing, it should be noted that the same elements will be designated by the same reference numerals, if possible, although they are shown in different drawings. Further, in the following description of the present disclosure, a detailed description of known functions and configurations incorporated herein will be omitted when it is determined that the description may make the subject matter of the present disclosure rather unclear.

In the present specification, a machine type communication (MTC) terminal refers to a terminal that supports low cost or low complexity, a terminal that supports coverage enhancement, or the like. In the present specification, the MTC terminal refers to the terminal that supports low cost or low complexity, the terminal that supports coverage enhancement, or the like. Alternatively, in the present specification, the MTC terminal refers to the terminal that is defined as a predetermined category for supporting low cost (or low complexity) and/or coverage enhancement.

In other words, in the present specification, the MTC terminal may refer to a newly defined third generation partnership project (3GPP) Release 13 low cost (or low complexity) UE category/type, which executes LTE-based MTC related operations. Alternatively, in the present specification, the MTC terminal may refer to a UE category/type that is defined in or before 3GPP Release-12 that supports the enhanced coverage or relatively low power consumption in comparison with the existing LTE coverage or may refer to a newly defined Release 13 low cost (or low complexity) UE category/type.

A wireless communication system according to embodiments of the present disclosure may be widely installed to provide various communication services, such as a voice date, packet data, and the like. The wireless communication system may include a user equipment (UE) and a base station (BS) or an evolved node B (eNB). Throughout the specification, a user terminal (UT) may be an inclusive concept indicating the terminal utilized in wireless communication and the UT may include a UE in wideband code division multiple access (WCDMA), long term evolution (LTE), high speed packet access (HSPA), and the like, and a mobile station (MS), the UT, a subscriber station (SS), a wireless device, and the like in global systems for mobile communication (GSM).

The base station or a cell may generally refer to a station that communicates with the user terminal, and the base station or the cell may be interchangeably used with the terms "Node-B," "evolved Node-B (eNB)," "sector," "site," "base transceiver system (BTS)," "access point," "relay node," "remote radio head (RRH)," "radio unit (RU)," "small cell," and the like.

That is, in the present specification, the base station or the cell may be construed as an inclusive concept indicating some areas or functions covered by the base station controller (BSC) in CDMA, the NodeB in WCDMA, the eNB or the sector (site) in LTE, and the like, and the concept may include any of various coverage areas such as a megacell, a macrocell, a microcell, a picocell, a femtocell, communication ranges of the relay node, the RRH, the RU, and the small cell.

There is a BS for controlling each of the above mentioned various cells. Thus, the BS may be construed in the following two ways: (1) the BS may be an apparatus itself that provides a mega cell, a macro cell, a micro cell, a picocell, a femtocell, and a small cell in association with a wireless area; or (2) the BS may indicate the wireless area itself. In (1), the BS may be devices for providing a predetermined wireless area that are controlled by the same entity or devices that interact with one another to cooperatively configure a wireless area. Based on the configuration type of the wireless area, the BS may be referred to as the eNB, an RRH, an antenna, an RU, a low power node (LPN), a point, a transmission/reception point, a transmission point, a reception point, and the like. In (2), the BS may be a wireless area itself where signals are received or transmitted from the perspective of the UT or a neighboring BS.

Therefore, the megacell, the macrocell, the microcell, the picocell, the femtocell, the small cell, the RRH, the antenna, the RU, the LPN, the point, the eNB, the transmission/reception point, the transmission point, and the reception point are collectively referred to as the BS.

In the specification, the UT and the BS are used as two inclusive transceiving subjects to embody the technology and technical concepts described in the specification and may not be limited to predetermined terms or words. Here, uplink (UL) refers to data transmission from the UT to the BS and data reception to the UT from the BS, and downlink (DL) refers to data transmission from the BS to the UT and data reception to the BS from the UT.

There are no restrictions on multiple access schemes applied to wireless communication systems. Multiple access schemes may include code division multiple access (CDMA), time division multiple access (TDMA), frequency division multiple access (FDMA), orthogonal frequency division multiple access (OFDMA), OFDM-FDMA, OFDM-TDMA, OFDM-CDMA, and the like. Embodiments of the present disclosure may be applicable to resource allocation in an asynchronous wireless communication scheme that evolves to LTE and LTE-advanced via global system for mobile communication (GSM), wideband code division multiple access (WCDMA), and high speed packet access (HSPA) and in a synchronous wireless communication scheme that evolves to CDMA, CDMA-2000, and UMB. The present disclosure should not be construed as being restricted or limited to a specific wireless communication field and should be construed as including all technical fields to which the technical spirit of the present disclosure is applicable.

The uplink transmission and downlink transmission may be performed using i) a time division duplex (TDD) scheme performing transmission based on different times or ii) a frequency division duplex (FDD) scheme performing transmission using different frequencies.

Further, according to a related specification, a system such as LTE and LTE-A configures the uplink and the downlink based on a single carrier or a pair of carriers. The uplink and the downlink may carry control information through a control channel such as Physical Downlink Control CHannel (PDCCH), Physical Control Format Indicator CHannel (PCFICH), Physical Hybrid ARQ Indicator CHannel (PHICH), Physical Uplink Control CHannel (PUCCH), Enhanced Physical Downlink Control CHannel (EPDCCH), and the like and may carry data through a data channel such as Physical Downlink Shared CHannel (PDSCH), Physical Uplink Shared CHannel (PUSCH), and the like.

Meanwhile, the uplink and the downlink may carry control information even by using enhanced PDCCH or extended PDCCH (EPDCCH).

In the present specification, a cell may refer to the coverage of a signal transmitted from a transmission/reception point (or a transmission point), a component carrier having the coverage of a signal transmitted from a transmission/reception point, or a transmission/reception point itself.

A wireless communication system according to embodiments refers to a coordinated multi-point transmission/reception (CoMP) system where two or more transmission/reception points cooperatively transmit a signal, a coordinated multi-antenna transmission system, or a coordinated multi-cell communication system. A CoMP system may include at least two multi-transmission/reception points and terminals A multi-transmission/reception point may be the BS or a macrocell (hereinafter, referred to as the eNB) and at least one remote radio head (RRH) that has high transmission power or low transmission power within a macrocell area and that is connected to the eNB through an optical cable or an optical fiber and wiredly controlled.

Hereinafter, the downlink refers to communication or a communication path from a multi-transmission/reception point to a terminal, and the uplink refers to communication or a communication path from a terminal to a multi-transmission/reception point. In the downlink, a transmitter may be a part of the multi-transmission/reception point, and a receiver may be a part of the terminal. In the uplink, a transmitter may be a part of the terminal, and a receiver may be a part of the multi-transmission/reception point.

Hereinafter, the situation in which a signal is transmitted and received through a channel such as PUCCH, PUSCH, PDCCH, EPDCCH, and PDSCH may be described through the expression "PUCCH, PUSCH, PDCCH, EPDCCH, and PDSCH are transmitted or received."

In addition, hereinafter, the expression "PDCCH is transmitted or received," or "a signal is transmitted or received through PDCCH" includes "EPDCCH is transmitted or received," or "a signal is transmitted or received through EPDCCH."

That is, a physical downlink control channel used herein may indicate PDCCH or EPDCCH and may indicate both of the PDCCH and the EPDCCH.

Also, for convenience of description, according to an embodiment of the present disclosure, EPDCCH may be applied to a part described using PDCCH, and PDCCH may be applied to a part described using EPDCCH.

Meanwhile, higher layer signaling, which will be described below, includes RRC signaling that carries RRC information including RRC parameters.

The eNB performs downlink transmission to terminals. The eNB may transmit Physical Downlink Shared Channel (PDSCH), which is a primary physical channel for unicast transmission, and the eNB may transmit Physical Downlink Control Channel (PDCCH) for carrying downlink control information such as scheduling required for reception of the PDSCH and scheduling approval information for transmission of an uplink data channel (e.g., Physical Uplink Shared Channel (PUSCH)). Hereinafter, transmission and reception of a signal through each channel may be described as transmission and reception of a corresponding channel.

An embodiment of the present invention may be applicable to resource allocation in an asynchronous wireless communication scheme that evolves to LTE and LTE-advanced via GSM, WCDMA, and HSPA and in a synchronous wireless communication scheme that evolves to CDMA, CDMA-2000, and UMB.

In the present specification, the MTC terminal refers to a terminal that supports low cost or low complexity, a terminal that supports coverage enhancement, or the like. Alternatively, in the present specification, the MTC terminal refers to a terminal that is defined as a predetermined category for supporting low cost (or low complexity) and/or coverage enhancement.

In other words, in the present specification, the MTC terminal may refer to a newly defined third generation partnership project (3GPP) Release 13 low cost (or low complexity) UE category/type, which executes LTE-based MTC related operations. Alternatively, in the present specification, the MTC terminal may refer to a UE category/type that is defined in or before 3GPP Release-12 that supports the enhanced coverage or relatively low power consumption in comparison with the existing LTE coverage or may refer to a newly defined Release 13 low cost (or low complexity) UE category/type. Alternatively, the MTC terminal may refer to a further enhanced MTC terminal defined in Release-14.

In this specification, a Narrow Band Internet of Things (NB-IoT) terminal refers to a terminal that supports wireless access for cellular IoT. The objective of NB-IoT technology includes enhanced indoor coverage, large-scale support for low-speed terminals, low latency sensitivity, low terminal cost, low power consumption, and optimized network structure.

As a representative usage scenario in new radio (NR), which is recently being discussed in the 3GPP, enhanced Mobile BroadBand (eMBB), massive MTC (mMTC), and Ultra Reliable and Low Latency Communication (URLLC) have been proposed.

In this specification, a frequency, a frame, a subframe, resources, resource blocks, a region, a band, a sub-band, a control channel, a data channel, a synchronization signal, various kinds of reference signals, various kinds of signals, and various kinds of messages which are associated with the NR may be interpreted in various meanings in the past, at present, or in the future.

Latency Reduction

Many discussions and studies have been conducted to reduce latency. The main purpose of latency reduction is to standardize the operation of a short transmission time interval (hereinafter referred to as "short TTI" or "sTTI") in order to improve TCP throughput.

The following issues have been considered in the discussions and the studies for reducing latency.

Assess specification impact and study feasibility and performance of TTI lengths between 0.5 ms and one OFDM symbol, taking into account impact on reference signals and physical layer control signaling.

Backwards compatibility shall be preserved (thus allowing normal operation of pre-Rel 13 UEs on the same carrier)

Latency reduction can be achieved by the following physical layer techniques
Short TTI
Reduced processing time in implementation
New frame structure of TDD
The following additional discussion is underway on latency reduction.
Following design assumptions are considered:
No shortened TTI spans over subframe boundary
At least for SIBs and paging, PDCCH and legacy PDSCH are used for scheduling
The potential specific impacts for the followings are studied
UE is expected to receive a sPDSCH at least for downlink unicast
sPDSCH refers PDSCH carrying data in a short TTI
UE is expected to receive PDSCH for downlink unicast
Whether a UE is expected to receive both sPDSCH and PDSCH for downlink unicast simultaneously
Additional study on the number of supported short TTIs
If the number of supported short TTIs is more than one,
Following design assumptions are used for the study
From evolved node B (eNB) perspective, existing non-sTTI and sTTI can be FDMed in the same subframe in the same carrier
Additional study on other multiplexing method(s) with existing non-sTTI for UE supporting latency reduction features
In this study, the following aspects are assumed.
PSS/SSS, PBCH, PCFICH and PRACH, Random access, SIB and Paging procedures are not modified.
The following aspects are further studied
Note: but the study is not limited to them.
Design of sPUSCH DM-RS
Alt.1: DM-RS symbol shared by multiple short-TTIs within the same subframe
Alt.2: DM-RS contained in each sPUSCH
HARQ for sPUSCH
Whether/how to realize asynchronous and/or synchronous HARQ
sTTI operation for Pcell and/or SCells by CA in addition to non-CA case
FIG. 1 is a diagram showing processing delays and a HARQ round trip time (RTT) in a base station (BS) and a terminal.
In average downlink latency calculation, latency may be calculated as follows.
The LTE U-plane one-way latency for a scheduled UE consists of the fixed node processing delays and 1 TTI duration for transmission, as shown in FIG. 1 below. Assuming that the processing times can be scaled by the same factor of TTI reduction keeping the same number of HARQ processes, the one way latency can be calculated as follows:

$$D=1.5 \text{ TTI (eNB processing and scheduling)}+1 \text{ TTI (transmission)}+1.5 \text{ TTI (UE processing)}+n*8 \text{ TTI (HARQ retransmissions)}=(4+n*8)\text{TTI}.$$

Considering a typical case where there would be 0 or 1 retransmission, and assuming error probability of the first transmission to be p, the delay is given by $$D=(4+p*8)\text{TTI}.$$

So, for 0% BLER(Block Error Rate), D=4*TTI,
And for 10% BLER, D=4.8*TTI.

Average UE Initiated UL Transmission Latency Calculation

Assume UE is in connected/synchronized mode and wants to do UL transmission, e.g., to send TCP ACK Table 1 shows the steps and their corresponding contribution to the UL transmission latency. To be consistent in comparison of DL and UL, the eNB processing delay in the UL is added after the UL data is received by the eNB (step 7).

TABLE 1

| Step | Description | Delay |
| --- | --- | --- |
| 1. | Average delay to next SR opportunity | SR periodicity/2 |
| 2. | UE sends SR | 1 TTI |
| 3. | eNB decodes SR and generates sheduling grant | 3 TTI |
| 4. | Transmission of scheduling grant (assumed always error free) | 1 TTI |
| 5. | UE processing delay (decoding Scheduling grant + L1 encoding of data) | 3 TTI |
| 6. | UE sends UL transmission | (1 + p * 8) TTI where p is initial BLER. |
| 7. | eNB receives and decodes the UL data | 1.5 TTI |

In the table above, steps 1 to 4 and half delay of step 5 is assumed to be due to scheduling request (SR), and the rest is assumed for UL data transmission.

Resource Mapping of Short TTI

Figure 2:
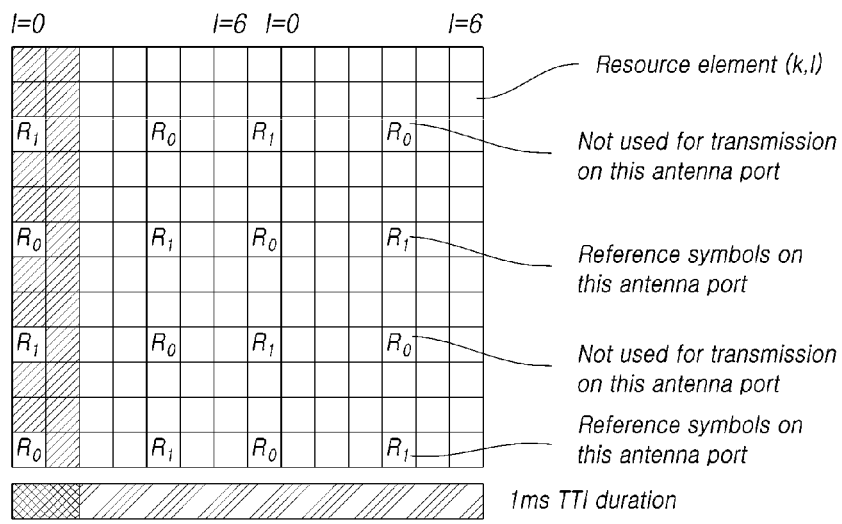
FIG. 2 is a diagram illustrating resource mapping for each physical resource block (PRB) in one subframe.
Figure 2:
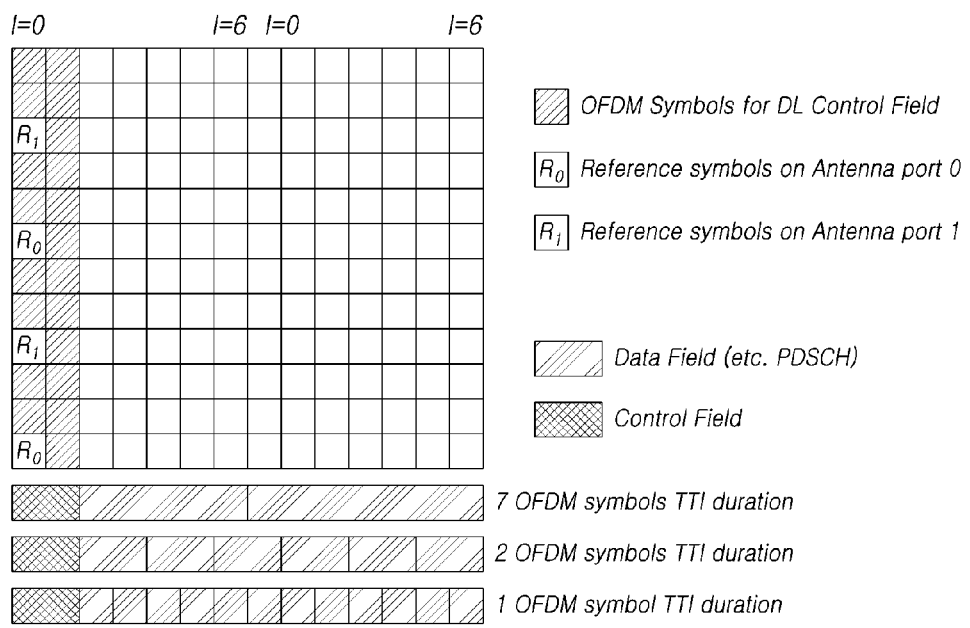

In FIG. 2, the resource map above is the legacy resource mapping per PRB in one subframe, considering a control field consisting of two antenna ports and two OFDM symbols. In FIG. 2, the resource map below is the short TTI resource mapping, considering a control field consisting of two OFDM symbols in order to ensure the backward compatibility. The loss rates ($L_{legacy}$, e.g., 5%-50%) of the PHY layer in short TI duration are assumed.

Transmit Block Size (TBS) Calculation of Short TTI

According to the resource mapping and the TBS calculation formula given above, the loss rate of PHY layer for legacy PDSCH is calculated as follows:

$$L_{legacy} = \frac{\text{the number of reference symbols within } PDSCH}{\text{the number of } REs \text{ within } PDSCH} = \frac{12}{144} = 8.3\%$$

For different short TTI duration, the TBS of short TTI in PDSCH may be calculated as the following Table 2:

TABLE 2

| TTI Duration | TBS of short TTI PDSCH ($TBS_{short}$) |
| --- | --- |
| 7 OFDM symbol | First time slot: $TBS_{short} = TBS_{legacy} \times \frac{60}{144} \times \frac{1-L_{short}}{1-8.3\%}$ |
| | Second time slot: $TBS_{short} = TBS_{legacy} \times \frac{84}{144} \times \frac{1-L_{short}}{1-8.3\%}$ |
| 2 OFDM symbol | $TBS_{short} = TBS_{legacy} \times \frac{24}{144} \times \frac{1-L_{short}}{1-8.3\%}$ |
| 1 OFDM symbol | $TBS_{short} = TBS_{legacy} \times \frac{12}{144} \times \frac{1-L_{short}}{1-8.3\%}$ |

Existing PUCCH

Figure 3:
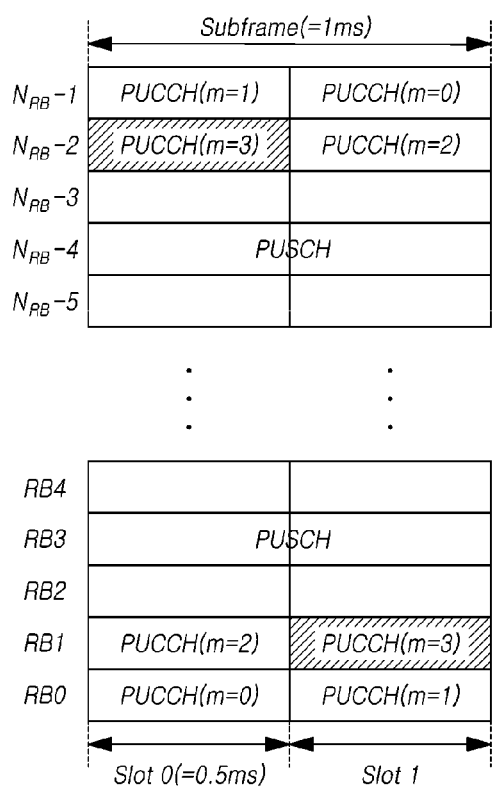
FIG. 3 is a diagram illustrating an uplink structure of legacy PUCCH.

PUCCH is a UL control channel that a terminal sends to a base station (BS) in response to reception of PDSCH. The terminal may use various PUCCH formats in order to transfer ACK/NACK and CQI information or the like for a downlink data channel to the eNB In the legacy LTE/LTE-Advanced frame structure (TTI=1 ms=14 OFDM symbols (Normal CP)/12 OFDM symbols (Extended CP)), slot-based PUCCH hopping may be performed as shown in FIG. 3. Such PUCCH hopping increases frequency diversity of PUCCH and consequently increases coverage of PUCCH because there is a gain in achieving diversity by transmitting the same signal or one information sequence across different frequency bands.

Figure 4:
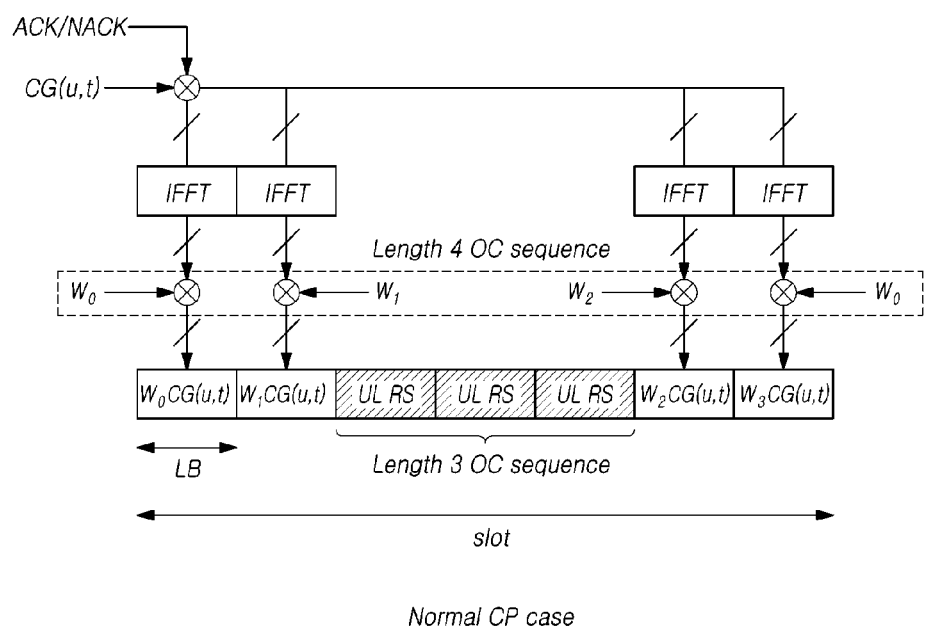
FIG. 4 is a diagram illustrating a concept of configuring a legacy PUCCH.

When ACK/NACK (A/N) is transmitted on the legacy PUCCH, resource allocation is applied to OCC (spreading)+CS (cyclic shift) on the basis of format 1a and 1b. As shown in FIG. 4, the legacy PUCCH is set to three symbol RSes and four symbol A/Ns on a slot basis.

According to embodiments of the present disclosure, CS-based A/N multiplexing resource allocation of a Zadoff-Chu (ZC) sequence except for the legacy OCC is considered in view of the decrease in number of symbols of short PUCCH (sPUCCH). In this case, OCC spreading is not used unlike the typical structure.

A ZC sequence may be defined as a cyclic shift value defined in the following RS $r_{u,v}^{(\alpha)}(n)$.

$$r_{u,v}^{(\alpha)}(n)=e^{j\alpha n}\bar{r}(n), 0 \leq n < M_{sc}^{RS} \quad \text{[Equation 1]}$$

In the present disclosure, the following default structure may be assumed for an sPUCCH A/N configuration excluding OCC.

Here, PUCCH format 1a/b performs dynamic resource allocation. Dynamic allocation shown in the following Equation 2 is performed on the basis of a CCE index of the scheduled PDCCH.

$$n_{PUCCH}^{(1,\tilde{p}0)} = n_{CCE} + N_{PUCCH}^{(1)} \quad \text{[Equation 2]}$$

Here, the PUCCH resource index for ACK/NACK $n_{PUCCH}^{(1,\tilde{p})}$ is determined by $n_{CCE}$, which is the lowest CCE index of the PDCCH used to transmit downlink control information (DCI) used for downlink resource allocation and $N_{PUCCH}^{(1)}$, which is transmitted in an upper layer. Here, $N_{PUCCH}^{(1)}$ finally refers to a shift value that is set to separate PUCCH format 1a/1b from PUCCH format 2/3/4 and the like.

Recently, additional agreements have been made concerning the sTTI as follows.

Specify support for a transmission duration based on 2-symbol sTTI and 1-slot sTTI for sPDSCH/sPDCCH Specify support for a transmission duration based on 2-symbol sTTI, 4-symbol sTTI, and 1-slot sTTI for sPUCCH/sPUSCH Down-selection is not precluded Study any impact on Channel Status Information (CSI) feedback and processing time, and if needed, specify necessary modifications For frame structures 1, 2, and 3, a minimum timing n+3 is supported for only UEs capable of reducing HARQ processing time for DL data and UL grant to UL data (For FS1,2&3, a minimum timing n+3 is supported for UL grant to UL data and for DL data to DL HARQ for UEs capable of operating with reduced processing time with only the following conditions).

A maximum TA is reduced to x ms, where x<=0.33 ms (an exact value is derived for further study (FFS))

At least when scheduled by PDCCH

For FS2, new DL HARQ and UL scheduling timing relations will be defined

Details FFS

FFS

Possible minimum timing of n+2 TTI

FFS max TA in this case

FFS what other restrictions (if any) on when reduced processing times of n+2 could be applied Possibility of scheduling by EPDCCH Reduced processing time(s) is/are RRC configured for the UE.

A mechanism for dynamic fallback to legacy processing timings (n+4) is supported Subsequently, further discussion at the conference is as follows.

Adopt the following behavior for handling the collision of conflicting UL grants with n+3 and n+4 timing The UE is not expected to receive conflicting UL grants with N+3 and N+4 timing scheduling PUSCH for the same UL subframe of a carrier Note: If the UE receives conflicting UL grants with N+3 and N+4 timing scheduling PUSCH for the same UL subframe of a carrier, the UE behavior is left up to UE implementation.

For FS1, the UE is not expected to be able to receive UL grants with N+3 and N+4 timing in the same subframe and carrier Note: This might not imply specification changes Also, subsequently, further determination at the conference is as follows.

The sequence-based sPUCCH without DMRS is supported for up to two HARQ-ACK bits in 2OS sTTI and 3OS sTTI.

ACK/NACK information maps to different cyclic shifts (i.e., ACK and NACK are indicated based on cyclic shift index)

The cyclic shifts on different sPUCCH symbols can be different due to cyclic shift randomization Cyclic shift randomization is re-used from 1 ms operation to support multiplexing with legacy PUCCH Only frequency hopping between sPUCCH symbol(s) is/are supported (no FH is not supported)

1 RB allocation per symbol

FFS: How to handle SR+HARQ, hopping pattern, A/N information mapping to CS

To be confirmed

As described above, studies have been conducted on the physical layer for the short TTI, and the transmission of the sequence-based sPUCCH without using DMRS is decided in 2-symbol sPUCCH. Lately, there are discussions on methods for handling scheduling request (SR) information, as well as the ACK/NACK information, by using sPUCCH.

The following embodiments may be applied to terminals, BSs, and core network entities (e.g., a mobility management entity (MME)) that are using any kind of mobile communication technology. For example, the following embodiments may also be applied to terminals, BSs, and core network entities (e.g., an access and mobility function (AMF)) that are used for next-generation mobile communication (5G mobile communication, new-RAT) as well as mobile communication terminals to which the LTE technology is applied. For convenience of description, a BS may be referred to as an evolved node B (eNB) of the LTE/E-UTRAN, the BS (i.e., a central unit (CU), a distributed unit (DU), or an entity in which a CU and a DU are implemented as a single logical entity) in a 5G wireless network in which a CU and a DU are separately provided, or a gNB.

Also, a typical transmission time interval or a legacy time interval described in the specification refers to a subframe time interval of 1 ms, which is used in the typical LTE/LTE-Advanced. That is, since the typical LTE/LTE-Advanced has a subframe time interval of 1 ms and consists of 14 symbols (for Normal CP) or 12 symbols (for Extended CP), the time interval may correspond to 14 or 12 symbols. Accordingly, the term "legacy" or "typical" described in the following embodiment may refer to the typical LTE/LTE-Advanced system having a subframe of 1 ms.

The type of a short transmission time interval (sTTI) described in this specification is used to identify a TTI symbol length in the sTTI. In detail, the symbol length refers to the number of symbols constituting one sTTI, and the number of symbols may be 2, 3, or 7.

Also, a cyclic shift value described in this specification may refer to a value of a cyclic shift index.

Figure 5:
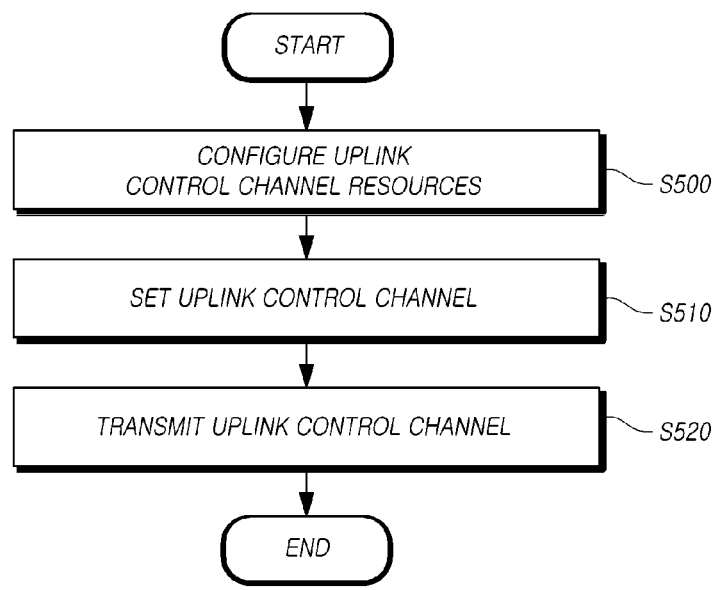
FIG. 5 is a flowchart showing a method of a terminal for transmitting an uplink control signal according to an exemplary embodiment.

FIG. 5 is a flowchart showing a method of a terminal for transmitting an uplink control signal according to an exemplary embodiment.

Referring to FIG. 5, a terminal may configure uplink control channel resources for indicating only HARQ ACK/NACK information and the uplink control channel resources for indicating both of scheduling request (SR) information and the HARQ ACK/NACK information (S500). The terminal may receive information needed to configure the uplink control channel resources from a base station (BS) through RRC signaling or DCI signaling.

In this case, the uplink control channel resources may be determined by using a plurality of cyclic shift indices. Each of the cyclic shift indices may be allocated for indicating the SR information or A/N information transmitted by a specific terminal.

For example, cyclic shift index #0 may be allocated for indicating the SR information of terminal UE #1, cyclic shift index #1 may be allocated for indicating ACK information of terminal UE #1, and cyclic shift index #2 may be allocated for indicating NACK information of terminal UE #1. Also, cyclic shift index #3 may be allocated for indicating ACK information of terminal UE #2, and cyclic shift index #4 may be allocated for indicating NACK information of terminal UE #2. Also, cyclic shift index #5 may be allocated for indicating ACK information of terminal UE #3, and cyclic shift index #6 may be allocated for indicating NACK information of terminal UE #3.

In the short TTI frame structure, the sequence-based short PUCCH (sPUCCH) may consist of two or three symbols and does not use DMRS. Accordingly, in order to determine which terminal has transmitted which of ACK information and NACK information, pieces of ACK/NACK data for terminals may be mapped to different cyclic shift indices of a ZC sequence. Accordingly, when the BS detects a cyclic shift index value from a received sequence-based sPUCCH, the BS may determine which specific terminal has transmitted which one of the ACK information and the NACK information.

In this case, for the uplink control channel resources, the number of uplink control channel resources allocated for indicating both of the SR information and the HARQ ACK/NACK information may be the same as the number of uplink control channel resources allocated for indicating only the HARQ ACK/NACK information. When the HARQ ACK/NACK information consists of 1 bit, the number of uplink control channel resources allocated for indicating both of the SR information and the HARQ ACK/NACK information may be two.

An example in which the uplink control channel resources are a plurality of cyclic shift indices will be described below.

When the uplink control channel resources are a plurality of cyclic shift indices, the plurality of cyclic shift indices may include indices allocated for indicating only the HARQ ACK/NACK information and indices allocated for indicating both of the SR information and the HARQ ACK/NACK information.

For example, among the plurality of cyclic shift indices, index #4 may be allocated to a terminal, UE #1, to indicate only the HARQ ACK information, and index #5 may be allocated to UE #1 to indicate only the HARQ NACK information. Also, index #1 may be allocated to another terminal, UE #2, to indicate both of the SR information and the HARQ ACK information, and index #2 may be allocated to UE #2 to indicate both of the SR information and the HARQ NACK information. Accordingly, the BS may detect a cyclic index value from the received sequence-based sPUCCH. In this case, the BS may determine that UE #1 has transmitted only the HARQ ACK information when the cyclic index value is four and may determine that UE #2 simultaneously has transmitted both of the SR information and the HARQ ACK information when the cyclic index value is two.

In this case, the number of cyclic shift indices mapped to the SR information may be the same as the number of cyclic shift indices mapped to the HARQ ACK/NACK information.

For example, two cyclic shift indices may be mapped so that a terminal indicates the HARQ ACK/NACK information of 1 bit. When the HARQ ACK/NACK information consists of 1 bit, the number of cyclic shift indices mapped so that the terminal indicates the SR information may be the number of cyclic shift indices mapped to the HARQ ACK/NACK information, that is, two.

As described, the number of cyclic shift indices mapped for the terminal to indicate the SR information is set to be identical to the number of cyclic shift indices mapped to the HARQ ACK/NACK information. By setting the number of cyclic shift indices identical, it is possible to piggyback the HARQ ACK/NACK information while transmitting the SR information.

For example, the number of cyclic shift indices mapped to indicate the SR information may be one. In this case, even when the BS detects a corresponding cyclic shift index after receiving sPUCCH including the SR information, the BS cannot use the index to distinguish between ACK information and NACK information. Accordingly, the BS should receive ACK/NACK information through separate sPUCCH. As anther example, the number of cyclic shift indices mapped to indicate the SR information may be two. In this case, the BS may determine whether ACK information or NACK information has been transmitted depending on which one of the two indices is detected after receiving sPUCCH including the SR information.

Also, the terminal may set the uplink control channel including the SR information and the HARQ ACK/NACK information on the basis of the uplink control channel resources (S510).

For example, the uplink control channel resources are a plurality of cyclic shift indices. Operations in this case will be described below.

In a short transmission time interval (sTTI) frame structure, the terminal may transmit the uplink control channel consisting of two or three symbols to the BS. In this case, a cyclic shift index value used for the uplink control channel may vary depending on SR information and the HARQ ACK/NACK information to be transmitted by the terminal.

Accordingly, when the BS detects a cyclic shift index from the uplink control channel, the BS may determine whether the uplink control channel corresponding to the detected cyclic shift index includes the SR information or the HARQ ACK/NACK information.

Also, the terminal may transmit the uplink control channel, which consists of two or three symbols in one sTTI, to the BS (S520). One sTTI in the sTTI frame structure may be consisting of two, three, or seven symbols while one TTI in the typical LTE consists of 14 symbols (for Normal CP) or 12 symbols (for Extended CP). Also, the uplink control channel may also consist of two or three symbols.

In this case, the uplink control channel consisting of two or three symbols may be set by using indices allocated for indicating both of the SR information and the HARQ ACK/NACK information. For example, when cyclic shift index #0 indicates SR information and ACK information of terminal UE #1, terminal UE #1 may set the uplink control channel by using cyclic shift index #0 and may transmit the uplink control channel to the BS. Thus, terminal UE #1 may simultaneously transfer SR information and ACK/NACK information to the BS through one uplink control channel.

Figure 6:
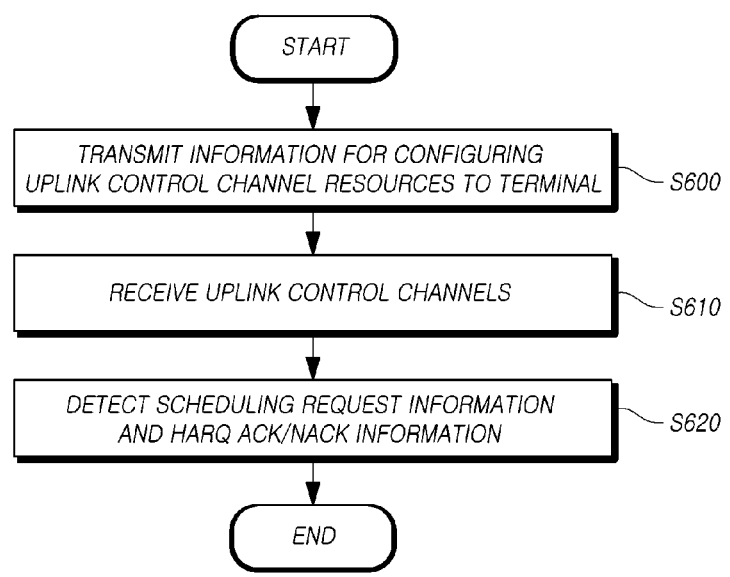
FIG. 6 is a flowchart showing a method of a base station (BS) for receiving an uplink control signal according to an exemplary embodiment.

FIG. 6 is a flowchart showing a method of a base station (BS) for receiving an uplink control signal according to an exemplary embodiment.

Referring to FIG. 6, the BS may transmit, to a terminal, information for configuring uplink control channel resources for indicating only HARQ ACK/NACK information and the uplink control channel resources for indicating both of the scheduling request (SR) information and the HARQ ACK/NACK information (S600). In this case, information regarding the uplink control channel resources may be a plurality of cyclic shift indices.

In this case, for the uplink control channel resources, the number of uplink control channel resources allocated for indicating both of the SR information and the HARQ ACK/NACK information may be the same as the number of uplink control channel resources allocated for indicating only the HARQ ACK/NACK information.

When the HARQ ACK/NACK information consists of 1 bit, the number of uplink control channel resources allocated for indicating both of the SR information and the HARQ ACK/NACK information may be two.

For example, the uplink control channel resources are a plurality of cyclic shift indices. Operations in this case will be described below.

For example, in the short transmission time interval (sTTI) frame structure, only 1 RB is allocated to the uplink control channel by default, and a length-12 ZC sequence is allocated to the 1 RB. Accordingly, the number of cyclic shift indices most available on the sequence is limited to 12. Accordingly, it is not possible to allocate, to all terminals connected to the BS, cyclic shift indices used to always transmit the SR information and the HARQ ACK/NACK information.

Accordingly, the BS may be configured to transmit information for configuring the information regarding the uplink control channel resources to terminals, thus allowing each of the terminals to use the information to configure information regarding uplink control channel resources. In this case, an example of the information transmitted by the BS to the terminal may be a period, position, or index value of a cyclic shift that may be used for SR by each terminal. The BS may transmit information needed to configure the cyclic shift indices to each terminal by using RRC or DCI signaling.

In this case, the number of cyclic shift indices mapped to the SR information may be the same as the number of cyclic shift indices mapped to the HARQ ACK/NACK information.

For example, two cyclic shift indices may be mapped so that a terminal indicates the HARQ ACK/NACK information of 1 bit. When the HARQ ACK/NACK information consists of 1 bit, the number of cyclic shift indices mapped so that the terminal indicates the SR information may be the same as the number of cyclic shift indices mapped to the HARQ ACK/NACK information, that is, two.

Also, the BS may receive the uplink control channel consisting of two or three symbols in one sTTI from the terminal (S610).

When the terminal transmits the SR information or the HARQ ACK/NACK information, the terminal may set the uplink control channel including the SR information and the HARQ ACK/NACK information on the basis of information for configuring information regarding the uplink control channel resources received from the BS. In this case, the uplink control channel may consist of two or three symbols.

Also, the BS may detect the SR information and the HARQ ACK/NACK information from the received uplink control channel (S620).

For example, the BS may detect a cyclic shift index value from the received uplink control channel. The BS may recognize the terminal having transmitted the uplink control channel on the basis of the detected cyclic shift index value and may determine the SR information and the HARQ ACK/NACK information that the terminal has transmitted.

The sTTI structure may have a structure in which the downlink and the uplink are similar to each other on the basis of 2-symbol and 7-symbol. Such a structure is finally determined. In this structure, slot boundaries of subframes remain unchanged. That is, no sTTI is present over slot #0 and slot #1 of a subframe.

Figure 7:
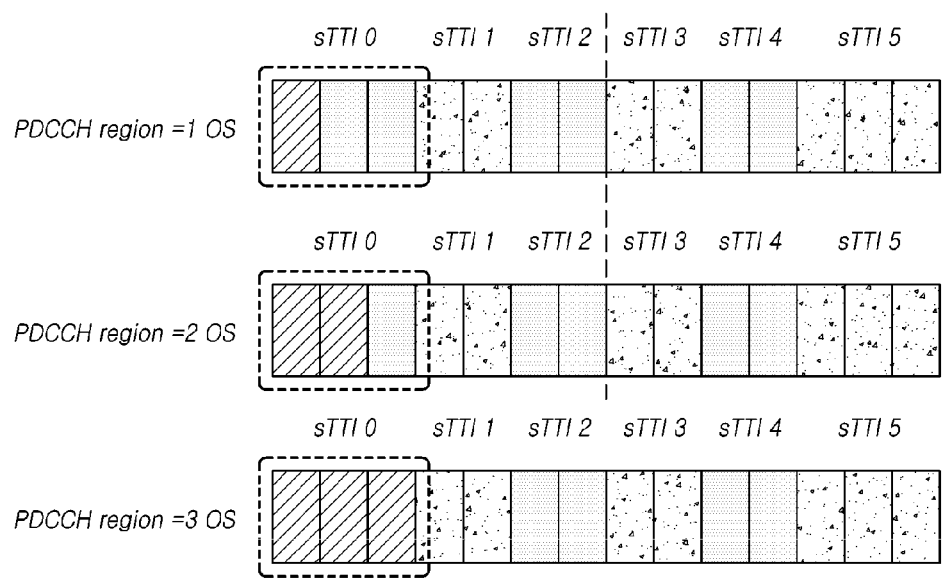
FIG. 7 is a diagram showing a short transmission time interval (sTTI) consisting of two or three symbols in a downlink (DL)

FIG. 7 is a diagram showing a short transmission time interval (sTTI) consisting of two or three symbols in a downlink.

Referring to FIG. 7, one subframe may consist of 6 sTTIs, i.e., sTTI0, sTTI1, sTTI2, sTTI3, sTTI4, and sTTI5. In order to maintain the slot boundaries of the subframe, sTTI0 and sTTI5 may consist of 3 symbols, and sTTI1, sTTI2, sTTI3, and sTTI4 may consist of 2 symbols.

A downlink control channel is present at the front of the subframe and may be consist of one to three symbols. The downlink control channel is positioned in the first symbol of sTTI0 when consisting of one symbol. The downlink control channel is positioned in the first two symbols of sTTI0 when consisting of two symbols. The downlink control channel is positioned in the entire sTTI0 when consisting of three symbols.

Figure 8:
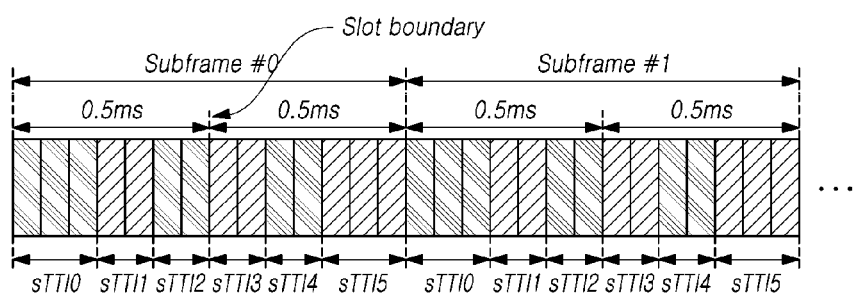
FIG. 8 is a diagram showing a short transmission time interval (sTTI) consisting of two or three symbols in an uplink.

FIG. 8 is a diagram showing a short transmission time interval (sTTI) consisting of two or three symbols in an uplink.

Referring to FIG. 8, one subframe may consist of 6 sTTIs, i.e., sTTI0, sTTI1, sTTI2, sTTI3, sTTI4, and sTTI5, like FIG. 7. In order to maintain slot boundaries of each subframe, sTTI0 and sTTI5 may consist of 3 symbols, and sTTI1, sTTI2, sTTI3, and sTTI4 may consist of 2 symbols.

A method of configuring short PUCCH (sPUCCH) consisting of two or three symbols in the sTTI will be described based on comparison with a method of configuring PUCCH in the legacy LTE/LTE-A system.

When HARQ ACK/NACK is transmitted on the PUCCH of the legacy LTE/LTE-A system, resource allocation is applied to OCC (spreading)+CS (cyclic shift) on the basis of PUCCH format 1a and 1b.

In the PUCCH of the legacy LTE/LTE-A system, the HARQ ACK/NACK mapping is basically configured as follows.

For example, when one ACK/NACK is mapped, only 1-bit information is needed. Thus, symbol mapping may be performed by using BPSK in order to indicate two different pieces of information. When two ACK/NACKs are mapped, only 2-bit information is needed. Thus, symbol mapping may be performed by using QPSK in order to indicate four different pieces of information.

Figure 9:
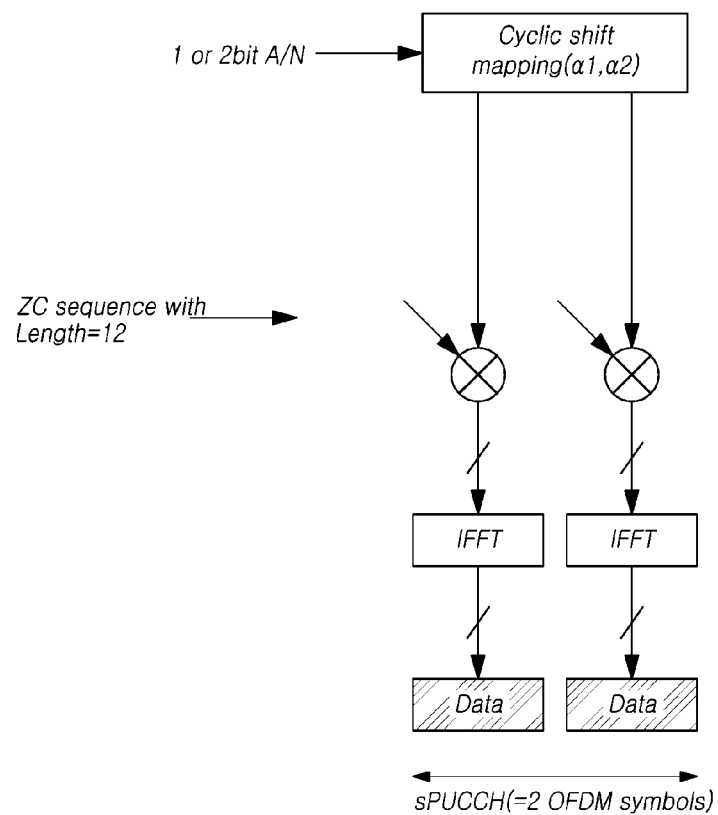
FIG. 9 is a diagram showing a structure of short PUCCH (sPUCCH) consisting of two symbols without DMRS.

On the other hand, when the HARQ ACK/NACK information of up to two bits is transmitted on sPUCCH consisting of two or three symbols unlike the PUCCH of the legacy LTE/LTE-A system, the transmission is made without using DMRS. Accordingly, unlike the legacy LTE/LTE-A system, HARQ ACK/NACK data is mapped to cyclic shifts of a ZC sequence without using DMRS as shown in FIG. 9, instead of symbols being mapped by using BPSK or QPSK to transmit different pieces of information. That is, a cyclic shift value mapped to transmit the HARQ ACK/NACK information of one or two bits is derived, and sPUCCH is configured on the basis of the derived cyclic shift value and the ZC sequence of length-12.

The ZC sequence used in this case is defined as a cyclic shift value a defined in the following RS $r_{u,v}^{(\alpha)}(n)$.

$$r_{u,v}^{(\alpha)}(n)=e^{j\alpha n}\bar{r}_{u,v}(n),\ 0 \le n < M_{sc}^{RS}$$

Here, a basic structure for mapping the HARQ ACK/NACK information of each terminal to different cyclic shift values α is assumed. That is, a specific cyclic shift index is mapped to HARQ ACK or NACK of each terminal. In this case, when a base station (BS) detects the cyclic shift value from the sPUCCH, the BS may recognize which terminal has transmitted ACK or NACK information. Also, when the cyclic shift value is mapped to the SR information rather than the HARQ ACK/NACK, the BS may recognize which terminal has transmitted the SR information by using the cyclic shift value detected from the sPUCCH.

A method of the terminal and the BS for transmitting and receiving an uplink control signal will be described in detail below with reference to various embodiments. The following embodiments will be described based on an example in which uplink control channel resources are determined by a cyclic shift index and HACK ACK/NACK information consists of 1 bit. The following embodiments may be applied individually or in combination.

Embodiment 1: A Single Cyclic Shift Value is Separately Allocated for Scheduling Request (SR) and is Set not to Overlap with a Cyclic Shift Value Defined for HARQ ACK/NACK In order to allocate ACK/NACK of up to 2 bits to short PUCCH (sPUCCH) consisting of two symbols, up to four cyclic shift indices are needed for each terminal. As described above, BPSK (1 bit ACK/NACK) mapping and QPSK (2 bit ACK/NACK) mapping are used for symbols in the legacy PUCCH format 1a/1b, and also A/N of up to 2 bits may be transmitted by using a single cyclic shift value (i.e., the use of transmission of A/N information of up to two codewords).

However, in the sPUCCH without using DMRS, there is only a difference between cyclic shift values as a method for identifying A/Ns. Accordingly, A/Ns should be mapped to different cyclic shift values on the basis of only one terminal.

In accordance with at least one embodiment, a method may be provided for allocating a specific cyclic shift index value to a terminal in order to transmit a scheduling request (SR) in such an environment. In this case, the following four methods may be applied as an embodiment in which the specific cyclic shift index value is applied to a terminal.

For example, in the following embodiment, cyclic shift values are allocated for SR information and HARQ ACK/NACK information of five different terminals UE #1, UE #2, UE #3, UE #4, and UE #5. Operations according to the following embodiment will be described. Also, operations when the HART ACK/NACK information consists of 1 bit will be described.

Also, in the following table, CS index refers to a cyclic shift index, Assigned UE refers to a terminal indicated by a cyclic shift index, and A/N field refers to A/N information indicated by a cyclic shift index (A represents ACK, N represents NACK, and Null represents no indication).

Embodiment 1-1: Different Cyclic Shift Values are Allocated to Terminals for the Use of SR Referring to Table 3, among 12 different cyclic shift values, a cyclic shift value of 0 is allocated for scheduling request (SR) of terminal UE #1, and a cyclic shift value of 1 is allocated for the SR of terminal UE #2. That it, the cyclic shift value used for the SR by terminal UE #1 is different from the cyclic shift value used for the SR by terminal UE #2.

The other cyclic shift values of 2 to 11 are allocated for HARQ ACK/NACK information of each terminal.

TABLE 3

| CS index | Assigned UE | A/N field |
|---|---|---|
| 0 | SR for UE#1 | |
| 1 | SR for UE#2 | |
| 2 | UE#1 | A |
| 3 | | N |
| 4 | UE#2 | A |
| 5 | | N |
| 6 | UE#3 | A |
| 7 | | N |
| 8 | UE#4 | A |
| 9 | | N |
| 10 | UE#5 | A |
| 11 | | N |

Embodiment 1-2: A Cyclic Shift Value is Allocated for the Use of Scheduling Request so that Specific Terminals May Use the Cyclic Shift Value as a Competition-Based Resource In a competition-based resource, one resource is shared by a plurality of terminals and only one of the terminals can use the resource at a certain time point.

Referring to Table 4, among 12 different cyclic shift values, a cyclic shift value of 0 is allocated for the SR of terminal UE #1, terminal UE #2, terminal UE #3, and a cyclic shift value of 1 is allocated for the SR of terminal UE #4 and terminal UE #5. In other words, this means that a plurality of terminals may use the cyclic shift values of 0 and 1 for the SR. Accordingly, when the cyclic shift value of 0 or 1 is detected, a base station (BS) configures setting information for determining which terminal has transmitted the SR and transmits the configured setting information to each terminal through RRC or DCI signaling.

The other cyclic shift values of 2 to 11 are allocated for HARQ ACK/NACK information of each terminal.

TABLE 4

| CS index | Assigned UE | A/N field |
|---|---|---|
| 0 | SR for UE#1, UE#2, UE#3 | |
| 1 | SR for UE#4, UE#5 | |
| 2 | UE#1 | A |
| 3 | | N |
| 4 | UE#2 | A |
| 5 | | N |
| 6 | UE#3 | A |
| 7 | | N |
| 8 | UE#4 | A |
| 9 | | N |
| 10 | UE#5 | A |
| 11 | | N |

Embodiment 1-3: For Specific Terminals, Different Cyclic Shift Values are Allocated for the Use of Scheduling Request, and for the Other Terminals, a Cyclic Shift Value is Allocated for the User of SR as a Competition-Based Resource Referring to Table 5, among 12 different cyclic shift values, a cyclic shift value of 0 is allocated for the SR of terminal UE #1, and a cyclic shift value of 1 is allocated for the SR of terminal UE #2, terminal UE #3, and terminal UE #4. In other words, this means that only terminal UE #1 may uses the cyclic shift value of 0 and the plurality of terminals UE #2, UE #3, and UE #4 may use the cyclic shift value of 1 for the SR. Accordingly, when the cyclic shift value of 0 is detected, the BS may determine that terminal UE #1 has transmitted the SR. On the other hand, when the cyclic shift value of 1 is detected, the BS configures setting information for determining which terminal has transmitted the SR and transmits the configured setting information to each terminal through RRC or DCI signaling.

The other cyclic shift values of 2 to 11 are allocated for HARQ ACK/NACK information of each terminal.

TABLE 5

| CS index | Assigned UE | A/N field |
|---|---|---|
| 0 | SR for UE#1 | |
| 1 | SR for UE#2, UE#3, UE#4 | |
| 2 | UE#1 | A |
| 3 | | N |
| 4 | UE#2 | A |
| 5 | | N |
| 6 | UE#3 | A |
| 7 | | N |
| 8 | UE#4 | A |
| 9 | | N |
| 10 | UE#5 | A |
| 11 | | N |

Embodiment 1-4: When Scheduling Request and A/N Transmission are Simultaneously Made, Priorities are Set for the Scheduling Request and the A/N Transmission, and then One of the Scheduling Request and the A/N Transmission is Dropped One cyclic shift value may be used to indicate one of the SR and the ACK/NACK transmission. Accordingly, the terminal cannot transmit the SR and the ACK/NACK transmission on one short PUCCH (sPUCCH) at the same time and may transmit only one having a higher priority out of the SR and the ACK/NACK on the sPUCCH. When the BS detects a corresponding cyclic shift value from the sPUCCH, the BS may determine whether the detected cyclic shift value indicates information regarding the SR or ACK/NACK information depending on the priorities.

The methods described in Embodiment 1-1 to 1-4 and Tables 3 to 5 are based on the first symbol of the sPUCCH. The mapping principle may also be applied to the second or third symbol that establishes linkage in the same manner, but an actual cyclic shift value being used or allocated may be different from the aforementioned cyclic shift value.

In a short transmission time interval (sTTI) structure, the sPUCCH allocates only one RB to each symbol by default. Accordingly, when cyclic shift indices are always individually defined for all the terminals, there may be a problem with A/N transmission due to a shortage of available cyclic shift indices.

Actually, the length-12 ZC sequence is allocated to 1 RB. In this case, the maximal number of cyclic shift values for the sequence is limited to 12. Accordingly, a special setting rule should be applied in order to separately allocate a cyclic shift value mapped to the SR.

For example, the BS may set, for each terminal, information regarding a mapped index value and a period and position of a cyclic shift, which may be actually used for the SR by the terminals, through RRC or DCI signaling. That is, information such as a period Nt (e.g., 200 subframe), a burst period Nb (e.g., 10 subframe), a position Nf (e.g., subrame #2,#6), a position in a subframe Nstti (e.g., sTTI index #1,#2), and ncs (CS #1) may be defined and set. Through such a method, it is possible to solve a problem in that cyclic shift values should be fixedly allocated for the SR of each terminal over the entire sPUCCH transmission area.

Embodiment 2: A Plurality of Cyclic Shift Values are Individually Allocated for Scheduling Request, and the Cyclic Shift Values are Set to be Different from Each Other, and the Number of Cyclic Shift Values is Set to be the Same as the Number of Cyclic Shift Indices Defined for HARQ ACK/NAKC This embodiment is intended to piggyback HARQ ACK/NACK information by using cyclic shift values used for scheduling request (SR) by default when the SR and HARQ ACK/NACK transmission are simultaneously made by the terminal.

That is, when a cyclic shift index is allocated for the SR, a plurality of cyclic shift indices may be allocated for the SR of a terminal. This is because, as described above, it is sufficient to allocate only one cyclic shift index in order to transmit only the SR information, but a number of cyclic shift indices equal to the number of available pieces of ACK/NACK information should be allocated for piggyback of up to HARQ ACK/NACK information.

For example, in order to piggyback the HARQ ACK/NACK information by using cyclic shift values used for the SR, two cyclic shift index values should be allocated for the SR information when an ACK/NACK to be transmitted by a terminal is of 1 bit, and a total of four cyclic shift index values should be allocated for the SR information when the ACK/NACK is of 2 bits. That is, the number of cyclic shift indices allocated for the SR should be the same as the number of cyclic shift indices allocated for ACK/NACK, and may be two for 1-bit ACK/NACK and may be four for 2-bit ACK/NACK.

When it is assumed that the terminal transmits 1-bit A/N on short PUCCH (sPUCCH) and cyclic shift index values are allocated for the SR according to Embodiment 2, as shown in Table 6, two cyclic shift indices 0 and 1 may be allocated for the SR of terminal UE #3, and two cyclic shift indices 6 and 7 may be allocated for ACK/NACK.

TABLE 6

| CS index | Assigned UE | A/N field |
|----------|-------------|-----------|
| 0        | SR for UE#3 | A         |
| 1        |             | N         |
| 2        | UE#1        | A         |
| 3        |             | N         |
| 4        | UE#2        | A         |
| 5        |             | N         |
| 6        | UE#3        | A         |
| 7        |             | N         |
| 8        | UE#4        | A         |
| 9        |             | N         |
| 10       | UE#5        | A         |
| 11       |             | N         |

Thus, it is possible to simultaneously transmit the SR information and the ACK/NACK information. Hereinafter, a method of a terminal UE #3 for simultaneously transmitting the SR information and the ACK/NACK information on one sPUCCH according an embodiment will be described below with reference to Table 6.

Step 1: Terminal UE #3 should simultaneously transmit the SR information and ACK/NACK information for sPDSCH through sPUCCH.

Step 2: Terminal UE #3 selects cyclic shift indices CS #0 and CS #1 mapped for the SR instead of cyclic shift indices CS #6 and CS #7 mapped for ACK/NACK to select a cyclic shift value corresponding to ACK (CS #0) or NACK (CS #1), maps the selected cyclic shift value to the sPUCCH, and transmits the cyclic shift mapped to the sPUCCH, to a base station (BS). When CS #6 or CS #7 is selected as the cyclic shift index, the BS may determine ACK/NACK information for terminal UE #3 but cannot determine the SR information. However, when CS #0 or CS #1 is selected, the BS may determine the SR information because the BS is aware that CS #0 or CS #1 is allocated for the SR of terminal UE #3. The BS may also determine the ACK/NACK information because the BS is aware that CS #0 is mapped to ACK and CS #1 is mapped to NACK.

Step 3: The BS checks the sPUCCH received from terminal UE #3. In this case, when the detected cyclic shift value is one of CS index #0 or #1, the BS determines that the SR and ACK are transmitted from terminal UE #3 (when CS #0 is detected) or determines that the SR and NACK are transmitted from terminal UE #3 (when CS #1 is detected).

Even in Embodiment 2, by default, the methods of Embodiments 1-1 to 1-4 may be applied in the same or similar manner.

Embodiment 2-1 Different Cyclic Shift Values are Allocated to Terminals for the Use of Scheduling Referring to Table 7, among 12 different cyclic shift values, cyclic shift values of 0 and 1 are allocated for the SR of terminal UE #1. When the cyclic shift value of 0 or 1 is detected, the BS may determine that the SR is received from terminal UE #1. Also, the BS may determine that terminal UE #1 transmits ACK along with the SR when the cyclic shift value of 0 is detected and may determine that terminal UE #1 transmits NACK along with the SR when the cyclic shift value of 1 is detected.

The other cyclic shift values of 2 to 11 are allocated for HARQ ACK/NACK information of each terminal.

TABLE 7

| CS index | Assigned UE | A/N field |
|----------|-------------|-----------|
| 0        | SR for UE#1 | A         |
| 1        |             | N         |
| 2        | UE#1        | A         |
| 3        |             | N         |
| 4        | UE#2        | A         |
| 5        |             | N         |
| 6        | UE#3        | A         |
| 7        |             | N         |
| 8        | UE#4        | A         |
| 9        |             | N         |
| 10       | UE#5        | A         |
| 11       |             | N         |

Embodiment 2-2: A Cyclic Shift Value is Allocated for the Use of Scheduling Request so that Specific Terminals May Use the Cyclic Shift Value as a Competition-Based Resource Referring to Table 8, among 12 different cyclic shift values, cyclic shift values of 0 and 1 are allocated for the SR of terminal UE #1, terminal UE #2, and terminal UE #3. In other words, this means that a plurality of terminals may use the cyclic shift values of 0 and 1 for the SR. Accordingly, when the cyclic shift value of 0 or 1 is detected, the base station configures setting information for determining which of terminal UE #1, terminal UE #2, and terminal UE #3 has simultaneously transmitted the SR and ACK/NACK and transmits the configured setting information to each terminal through RRC or DCI signaling.

The other cyclic shift values of 2 to 11 are allocated for HARQ ACK/NACK information of each terminal.

TABLE 8

| CS index | Assigned UE              | A/N field |
|----------|--------------------------|-----------|
| 0        | SR for UE#1, UE#2, UE#3  | A         |
| 1        |                          | N         |
| 2        | UE#1                     | A         |
| 3        |                          | N         |
| 4        | UE#2                     | A         |
| 5        |                          | N         |
| 6        | UE#3                     | A         |
| 7        |                          | N         |
| 8        | UE#4                     | A         |
| 9        |                          | N         |
| 10       | UE#5                     | A         |
| 11       |                          | N         |

Embodiment 2-3: For Specific Terminals, Different Cyclic Shift Values are Allocated for the Use of Scheduling Request, and for the Other Terminals, a Cyclic Shift Value is Allocated for the User of SR as a Competition-Based Resource Referring to Table 9, among 12 different cyclic shift values, cyclic shift values of 0 and 1 are allocated for the SR of terminal UE #1, and cyclic shift values of 2 and 3 are allocated for the SR of terminal UE #2, terminal UE #3, and terminal UE #4. In other words, this means that only terminal UE #1 may uses the cyclic shift values of 0 and 1 and the plurality of terminals UE #2, UE #3, and UE #4 may use the cyclic shift values of 2 and 3 for the SR. Accordingly, when the cyclic shift value of 0 or 1 is detected, the base station may determine that terminal UE #1 has transmitted the SR. On the other hand, when the cyclic shift value of 2 or 3 is detected, the base station configures setting information for determining which terminal has transmitted the SR and transmits the configured setting information to each terminal through RRC or DCI signaling.

Meanwhile, the other cyclic shift values of 4 to 11 are allocated for HARQ ACK/NACK information of UE #1, UE #2, UE #3, and UE #4.

TABLE 9

| CS index | Assigned UE | A/N field |
|---|---|---|
| 0 | SR for UE#1 | A |
| 1 | | N |
| 2 | SR for UE#2, UE#3, UE#4 | A |
| 3 | | N |
| 4 | UE#1 | A |
| 5 | | N |
| 6 | UE#2 | A |
| 7 | | N |
| 8 | UE#3 | A |
| 9 | | N |
| 10 | UE#4 | A |
| 11 | | N |

The methods described in Embodiment 2-1 to 2-3 and Tables 7 to 9 are based on the first symbol of short PUCCH (sPUCCH). The mapping principle may also be applied to the second or third symbol that establishes linkage in the same manner, but an actual cyclic shift value being used or allocated may be different from the aforementioned cyclic shift value.

Also, when the SR resources are allocated, the number of cyclic shifts to be allocated varies depending on whether ACK/NACK is of 1 bit or of 2 bits. Also, in comparison to a case in which one cyclic shift index is independently allocated for the use of mapping to the SR of each terminal, a large number of cyclic shift indices should always be allocated for the SR in advance. Accordingly, CS resources to be used for A/N transmission may be insufficient.

Accordingly, a special setting rule should be applied in order to separately allocate a cyclic shift value mapped to the SR.

For example, the base station may set, for each terminal, information regarding a mapped index value and a period and position of a cyclic shift, which may be actually used for the SR by the terminals, through RRC or DCI signaling. That is, information such as a period Nt (e.g., 200 subframe), a burst period Nb (e.g., 10 subframe), a position Nf (e.g., subrame #2, #6), a position in a subframe Nstti (e.g., sTTI index #1,#2), and ncs (CS #1) may be defined and set. Through such a method, it is possible to solve a problem in that cyclic shift values should be fixedly allocated for the SR of each terminal over the entire sPUCCH transmission area.

In accordance with at least one embodiment of the present disclosure, a method may be provided for multiplexing and transmitting/receiving the SR information and the HARQ ACK/NACK information through the sPUCCH consisting of two symbols in a short transmission time interval (sTTI). The principle may be applied to similar signals and channels, and the application is not limited only to a new frame structure.

Figure 10:
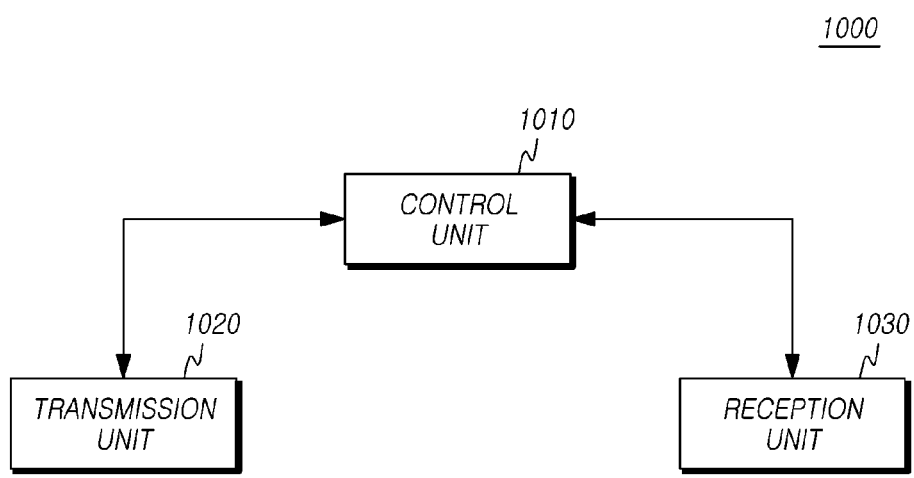
FIG. 10 is a diagram showing a base station (BS) according to an exemplary embodiment.

FIG. 10 is a diagram showing a base station according to exemplary embodiments.

Referring to FIG. 10, a base station 1000 according to exemplary embodiments includes a control unit 1010, a transmission unit 1020, and a reception unit 1030.

The control unit 1010 detects scheduling request (SR) information and HARQ ACK/NACK information from an uplink control channel received from a terminal.

As described above, the base station 1000 may detect a cyclic shift index value from short PUCCH (sPUCCH) received from the terminal and may detect HART ACK/NACK information and the SR information corresponding to the detected index value.

Also, the transmission unit 1020 and the reception unit 1030 are used to transmit or receive signals, messages, or data needed to implement the above-described present invention embodiments to or from the terminal.

The transmission unit 1020 transmits, to the terminal, information for configuring uplink control channel resources for indicating only the HARQ ACK/NACK information and the uplink control channel resources for indicating both of the SR information and the HARQ ACK/NACK information. In this case, the uplink control channel resources may be determined by using a plurality of cyclic shift indices.

In this case, for the above-described uplink control channel resources, the number of uplink control channel resources allocated for indicating both of the SR information and the HARQ ACK/NACK information may be the same as the number of uplink control channel resources allocated for indicating only the HARQ ACK/NACK information. When the HARQ ACK/NACK information consists of 1 bit, the number of uplink control channel resources allocated for indicating both of the SR information and the HARQ ACK/NACK information may be two.

For example, the uplink control channel resources are a plurality of cyclic shift indices. Related operations will be described below.

The plurality of cyclic shift indices may include i) indices allocated for indicating only the HARQ ACK/NACK information and ii) indices allocated for indicating both of the SR information and the HARQ ACK/NACK information. As described above, when the base station detects the cyclic shift index value for indicating both of the SR information and the HARQ ACK/NACK information from the uplink control channel received from the terminal, the base station may determine that a specific terminal has transferred both of the SR and the HARQ ACK/NACK information.

In this case, in order for a specific cyclic shift index value to indicate both of the SR information and the HARQ ACK/NACK information, as described above, the number of cyclic shift indices mapped to the SR information should be the same as the number of cyclic shift indices mapped to the HARQ ACK/NACK information. The HARQ ACK/NACK information may indicate two different pieces of information when the HARQ ACK/NACK information is of 1 bit and may indicate four different pieces of information when the HARQ ACK/NACK information is of 2 bits. Thus, the number of cyclic shift indices mapped to the SR information may be two or four.

The reason why the number of cyclic shift indices mapped in order to indicate the SR information is the same as the number of cyclic shift indices mapped to the HARQ ACK/NACK information is to piggyback the HARQ ACK/NACK information while transmitting the SR information. For example, the number of cyclic shift indices mapped in order to indicate the SR information may be one. In this case, even when the base station detects a corresponding cyclic shift index after receiving sPUCCH including the SR information, the base station cannot use the index to distinguish between ACK information and NACK information. Accordingly, the base station should receive ACK/NACK information through separate sPUCCH. For anther example, the number of cyclic shift indices mapped to indicate the SR information may be two. In this case, the base station may determine whether ACK information or NACK information has been transmitted depending on which one of the two indices is detected after receiving sPUCCH including the SR information.

The reception unit 1030 receives an uplink control channel consisting two or three symbols in one short transmission time interval (sTTI) from the terminal. In this case, the sTTI may consist of two or three symbols.

Figure 11:
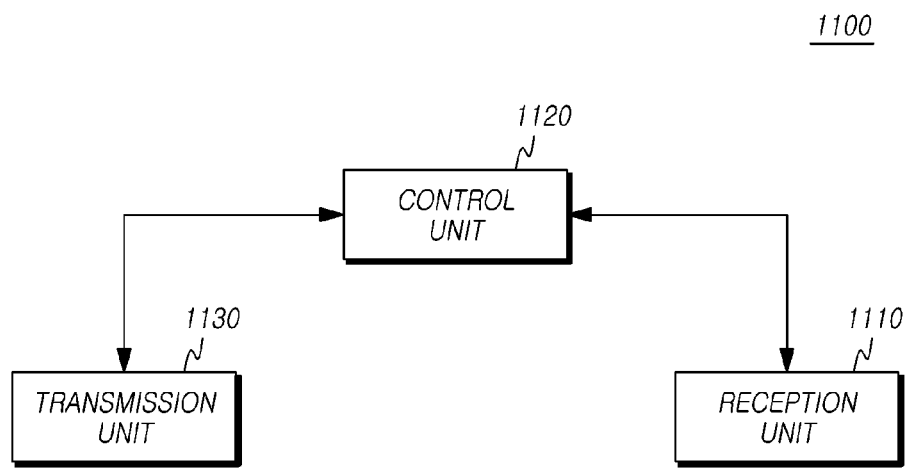
FIG. 11 is a diagram showing a user terminal (UT) according to an exemplary embodiment.

FIG. 11 is a diagram showing a user terminal (UT) according to exemplary embodiments.

Referring to FIG. 11, the UT 1100 according to exemplary embodiments includes a reception unit 1110, a control unit 1120, and a transmission unit 1130.

The reception unit 1110 receives downlink control information, data, and messages from the base station through a corresponding channel.

The control unit 1120 configures i) uplink control channel resources for indicating only HARQ ACK/NACK information and ii) uplink control channel resources for indicating both of scheduling request (SR) information and the HARQ ACK/NACK information and sets an uplink control channel including the SR information and the HARQ ACK/NACK information. In this case, the uplink control channel resources may be determined by using a plurality of cyclic shift indices.

In this case, for the uplink control channel resources, the number of uplink control channel resources allocated for indicating both of the SR information and the HARQ ACK/NACK information may be the same as the number of uplink control channel resources allocated for indicating only the HARQ ACK/NACK information. When the HARQ ACK/NACK information consists of 1 bit, the number of uplink control channel resources allocated for indicating both of the SR information and the HARQ ACK/NACK information may be two.

For example, the uplink control channel resources are a plurality of cyclic shift indices. Related operations will be described below.

The plurality of cyclic shift indices may include indices allocated for indicating both of the SR information and the HARQ ACK/NACK information. Accordingly, when the UT transmits an uplink control channel to the base station by using the indices allocated for indicating both of the SR information and the HARQ ACK/NACK information, the base station may receive the uplink control channel and then detect both of the SR information and the HARQ ACK/NACK information.

In this case, in order to indicate both of the SR information and the HARQ ACK/NACK information, a specific cyclic shift index may be independently allocated to a single terminal, or such a specific cyclic shift index may be shared by a plurality of terminals and then allocated to the plurality of terminals on competition basis. When the specific cyclic shift index is allocated to the plurality of terminals on competition basis, the base station should transmit information regarding to which terminal the specific cyclic shift index is allocated to each terminal through RRC or DCI signaling.

The transmission unit 1130 transmits uplink control information, data, and messages to the base station through a corresponding channel.

The transmission unit 1130 transmits the uplink control channel, which consists of two or three symbols in one short transmission time interval (sTTI), to the base station. In this case, the sTTI may consist of two or three symbols.

The exemplary embodiments may provide a detailed solution for multiplexing and transmitting/receiving the SR information and the HARQ ACK/NACK information through short PUCCH (sPUCCH) consisting of two or three symbols when a terminal and a base station transmits and receives an uplink control channel.

Specifications and standards mentioned in the foregoing embodiments are omitted herein to simplify the description of the specification and constitute part of the present specification. Therefore, it should be understood that part of the specifications and standards can be added to the present specification or be specified in the claims within the scope of the present invention.

The above description is only illustrative of the technical idea of the present invention, and those skilled in the art will appreciate that various modifications, additions and substitutions are possible, without departing from the essential characteristics of the invention. Therefore, the embodiments disclosed herein are intended not to limit but to describe the technical spirit of the present invention, and the scope of the present invention is not limited to the embodiments. The scope of the invention should be construed by the appended claims, and all technical sprits within the scope of their equivalents should be construed as included in the scope of the invention.

Moreover, the terms "system," "processor," "controller," "component," "module," "interface,", "model," "unit" or the like are generally intended to refer to a computer-related entity, either hardware, a combination of hardware and software, software, or software in execution. For example, a component may be, but is not limited to being, a process running on a processor, a processor, a controller, a control processor, an object, an executable, a thread of execution, a program, and/or a computer. By way of illustration, both an application running on a controller or processor and the controller or processor can be a component. One or more components may reside within a process and/or thread of execution and a component may be localized on one computer and/or distributed between two or more computers.

What is claimed is:

1. A method of a terminal for transmitting a short uplink control channel, the method comprising:
configuring i) first uplink control channel resources for indicating only HARQ ACK/NACK information and ii) second uplink control channel resources for simultaneously indicating both of scheduling request (SR) information and the HARQ ACK/NACK information;
setting the short uplink control channel with two or three symbols in one short transmission time interval (sTTI) to include the SR information and the HARQ ACK/NACK information by using the second uplink control channel resources for indicating both of the SR information and the HARQ ACK/NACK information; and
transmitting the short uplink control channel to a base station.

2. The method of claim 1, wherein the first and second uplink control channel resources are determined using a plurality of cyclic shift indices.

3. The method of claim 1, wherein the number of second uplink control channel resources allocated for indicating both of the SR information and the HARQ ACK/NACK information is the same as the number of first uplink control channel resources allocated for indicating only the HARQ ACK/NACK information.

4. The method of claim 3, wherein when the HARQ ACK/NACK information consists of 1 bit, the number of second uplink control channel resources allocated for indicating both of the SR information and the HARQ ACK/NACK information is two.

5. A method of a base station for receiving short uplink control channel, the method comprising:
- transmitting, to a terminal, information for configuring i) first uplink control channel resources for indicating only HARQ ACK/NACK information and ii) second uplink control channel resources for indicating both of scheduling request (SR) information and the HARQ ACK/NACK information;
- receiving the short uplink control channel made up of two or three symbols in one short transmission time interval (sTTI) and configured using the second uplink control channel resources, from the terminal; and
- detecting the SR information and the HARQ ACK/NACK information from the short uplink control channel.

6. The method of claim 5, wherein the first and second uplink control channel resources are determined using a plurality of cyclic shift indices.

7. The method of claim 5, wherein the number of second uplink control channel resources allocated for indicating both of the SR information and the HARQ ACK/NACK information is the same as the number of first uplink control channel resources allocated for indicating only the HARQ ACK/NACK information.

8. The method of claim 7, wherein when the HARQ ACK/NACK information consists of 1 bit, the number of second uplink control channel resources allocated for indicating both of the SR information and the HARQ ACK/NACK information is two.

9. A terminal for transmitting a short uplink control channel, the terminal comprising:
- a control unit configured to configure i) first uplink control channel resources for indicating only HARQ ACK/NACK information and ii) second uplink control channel resources for indicating both of scheduling request (SR) information and the HARQ ACK/NACK information and set the short uplink control channel with two or three symbols in one short transmission time interval (sTTI) to include the SR information and the HARQ ACK/NACK information using the second uplink control channel resources for indicating both of the SR information and the HARQ ACK/NACK information; and
- a transmission unit configured to transmit the short uplink control channel to a base station.

10. The terminal of claim 9, wherein the first and second uplink control channel resources are determined using a plurality of cyclic shift indices.

11. The terminal of claim 9, wherein the number of second uplink control channel resources allocated for indicating both of the SR information and the HARQ ACK/NACK information is the same as the number of first uplink control channel resources allocated for indicating only the HARQ ACK/NACK information.

12. The terminal of claim 11, wherein when the HARQ ACK/NACK information consists of 1 bit, the number of second uplink control channel resources allocated for indicating both of the SR information and the HARQ ACK/NACK information is two.

* * * * *